United States Patent [19]

Tokutomi

[11] 4,192,589
[45] Mar. 11, 1980

[54] ABNORMAL OPERATION WARNING APPARATUS FOR A CAMERA

[75] Inventor: Seijiro Tokutomi, Tokyo, Japan
[73] Assignee: Asahi Kogaku Kogyo Kabushiki Kaisha, Tokyo, Japan
[21] Appl. No.: 849,579
[22] Filed: Nov. 8, 1977
[30] Foreign Application Priority Data
 Nov. 8, 1976 [JP] Japan .................. 51/149732[U]
[51] Int. Cl.² .......................................... G03B 17/20
[52] U.S. Cl. ................................. 354/53; 354/60 L
[58] Field of Search .............. 354/23 D, 37, 41, 58, 354/53, 60 L, 289, 28; 352/170, 171; 340/201 P, 221, 378 R; 356/215, 226, 227, 229; 250/214 P; 73/5

[56] References Cited

U.S. PATENT DOCUMENTS

| | | | |
|---|---|---|---|
| 2,588,368 | 3/1952 | Edgerton | 73/5 |
| 3,487,757 | 1/1970 | Kiper | 354/60 L X |
| 3,581,634 | 6/1971 | Ort | 354/60 L X |
| 3,592,113 | 7/1971 | Wasielewski | 354/60 L X |
| 3,699,857 | 10/1972 | Wagner et al. | 354/60 L |
| 3,738,237 | 6/1973 | Uchiyama et al. | 354/60 L X |
| 3,765,006 | 10/1973 | Takahashi et al. | 354/60 L X |
| 3,913,376 | 10/1975 | Scott | 73/5 |
| 4,041,504 | 8/1977 | Iodvalkis et al. | 354/53 X |
| 4,051,491 | 9/1977 | Toyoda | 354/60 L |
| 4,061,431 | 12/1977 | Toyoda | 356/227 |
| 4,065,777 | 12/1977 | Maitani et al. | 354/60 R X |

FOREIGN PATENT DOCUMENTS 2618139 11/1976 Fed. Rep. of Germany ........ 354/60 L

Primary Examiner—Michael L. Gellner
Assistant Examiner—William B. Perkey
Attorney, Agent, or Firm—Sughrue, Rothwell, Mion, Zinn and Macpeak

[57] ABSTRACT

An abnormal operation warning apparatus is disclosed which is capable of evaluating the photographic result for each photographing process of a camera. The warning apparatus includes a first voltage generator for producing a first voltage signal having a level corresponding to the film sensitivity set before photographing, and a second voltage generator for producing a second voltage signal having a level corresponding to the amount of light exposed on the film for each photographing process. The two voltage signal levels from the first and second voltage generators are compared by a comparator. The photographic effect is evaluated by a discriminator in response to the comparison result, thereby preventing any subsequent abnormal or undesirable photographic result.

3 Claims, 3 Drawing Figures

4,192,589

ABNORMAL OPERATION WARNING APPARATUS FOR A CAMERA

BACKGROUND OF THE INVENTION

The present invention relates to an abnormal operation warning apparatus for a camera and more particularly to such an apparatus which is capable of evaluating or monitoring whether or not a correct exposure on the film used is accomplished for each photographic process.

One of the unsatisfactory photographing factors involves defective or inferior operation of the associated camera. More specifically, any faulty operation of the shutter, diaphragm, exposure meter and/or automatic exposure control mechanism would result in unsatisfactory photographing, but it frequently appears that the camera is operating normally. For this reason, the photographer cannot be aware of such faulty operation until he sees the developed film.

SUMMARY OF THE INVENTION

It is therefore an object of the invention to provide an abnormal operation warning apparatus for a camera, which permits the photographer to monitor any abnormal or faulty operation on the associated camera for each photographic process.

The object of the invention is attained by an abnormal operation warning apparatus comprising a first voltage signal generating means operative to produce a first voltage signal having a level proportional to the film sensitivity used; a second voltage signal generating means operative to produce a second voltage signal having a level proportional to the amount of light exposed on said film; a comparison means coupled with said first and second voltage signal generating means to compare the level of said first voltage signal derived from the former with that of said second voltage signal derived from the latter; and a discriminating means coupled with said comparison means to detect the difference between the two levels of said first and second voltage signals compared thereby and to evaluate and permit the photographer to identify each photographic result in response to the magnitude of said difference.

PREFERRED EMBODIMENT OF THE INVENTION

Figure 1:
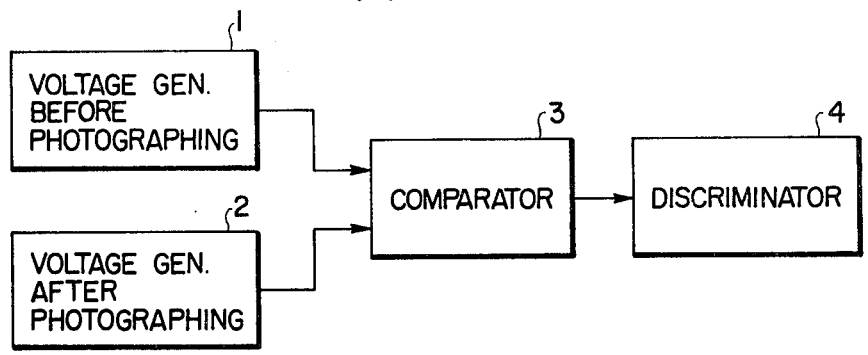
FIG. 1 is a schematic block diagram showing an abnormal operation warning apparatus in accordance with the present invention.

In FIG. 1, reference numerals 1 and 2 designate a first voltage signal generating circuit for producing a voltage signal having a level corresponding to the film sensitivity set before photographing, and a second voltage signal generating circuit for producing a voltage signal having a level corresponding to the amount of light exposed on the film upon the completion of photographing process, respectively. The two voltage signals thus produced from the first and second voltage signal generating circuits 1 and 2 are applied to a comparator 3. A signal representative of the comparison result by the comparator 3 is applied to a discriminator 4. Thus, the discriminator 4 acts to evaluate and permit the photographer to identify whether or not a correct exposure on the film is obtained in response to the level of signal derived from the comparator 3.

Figure 2:
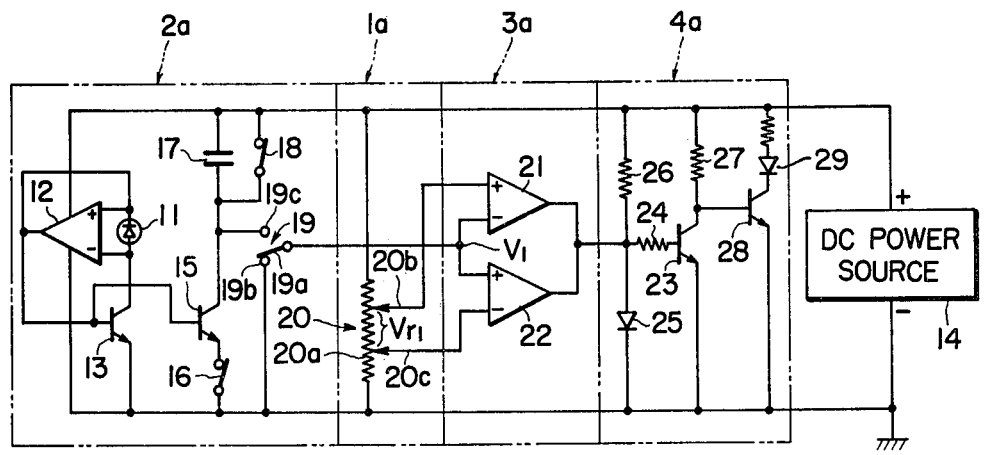
FIG. 2 is a practical circuit diagram where the present invention is applied to a focal plane shutter camera.

FIG. 2 is a practical circuit diagram where the abnormal operation warning apparatus shown in FIG. 1 is applied to a focal plane shutter camera device.

Figure 3:
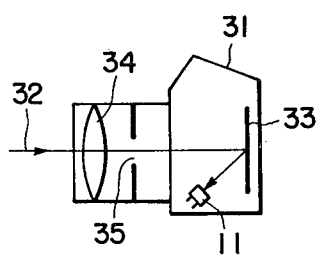
FIG. 3 is a schematic cross sectional side view of a camera including a light receiving element shown in FIG. 2.

In FIG. 2, a circuit portion corresponding to the second voltage signal generating circuit 2 of FIG. 1 comprises a light measuring circuit 2a including a light receiving element such as a photodiode 11 disposed, as shown in FIG. 3, within a camera housing 31 to receive light 32 focussed on a film 33 through a lens system 34 and a diaphragm aperture 35 after being reflected from a photographic object (not shown) and then reflected from the focussed surface portion of the film 33. The photodiode 11 is connected between the positive and negative input terminals of a differential type operational amplifier 12 to produce a photocurrent proportional to the amount of light received thereon, and has an anode connected to the collector of an NPN type logarithmic compression transistor 13. The transistor 13 has an emitter connected to the grounded negative pole of a dc power source 14 such as a dry cell, and a base connected to the output terminal of the amplifier 12 and the cathode of the photodiode 11. The photodiode 11, amplifier 12 and transistor 13 jointly constitute a conventional feedback circuit functioning to produce on the base of transistor 13 a voltage having a level proportional to the logarithm of photocurrent flowing through the photodiode 11. Thus, the base of transistor 13 is further connected to the base of an NPN type logarithmic expansion transistor 15. The transistor 15 has an emitter connected to ground via a normally closed switch 16 opened interlockingly with the start of a camera rear curtain (not shown), and a collector connected to the positive pole of the dc power source 14 via a parallel circuit consisting of an integration capacitor 17 and a normally closed switch 18 opened interlockingly with the start of a camera front curtain (not shown). The collector of transistor 15 is also connected to one fixed contact 19c of a double-throw switch 19 which has a movable contact 19a and another fixed contact 19b. The switch 19 is operated such that its movable contact 19a is changed over from the fixed contact 19b to the fixed contact 19c when the rear curtain is moved.

A circuit portion 1a corresponding to the first voltage signal generating circuit 1 of FIG. 1 comprises a potentiometer 20 constituted by an elongated resistor body 20a connected across the dc power source 14, and two slidable arms 20b and 20c respectively slidable along the resistor body 20a.

A circuit portion 3a corresponding to the comparator 3 of FIG. 1 comprises a first open collector type comparator 21 having a positive input terminal connected to the upper side slidable arm 20b of the potentiometer 20, and a second open collector type comparator 22 having a negative input terminal connected to the lower slidable arm 20c of the potentiometer 20, the negative input terminal of the comparator 21 and the positive input terminal of the comparator 22 being connected in common to the movable contact 19a of the double-throw switch 19.

Finally, a circuit portion 4a corresponding to the discriminator 4 of FIG. 1 includes an NPN grounded emitter transistor 23 having a base connected via a resistor 24 to the common output terminal of the comparators 21 and 22. The junction point of the resistor 24 and the common output terminal of the comparators 21, 22 is connected to ground via a light emitting diode 25 (hereinafter referred to as "LED") and to the positive pole of the dc power source 14 via a resistor 26. The collector of transistor 23 is connected via a resistor 27 to the positive pole of the dc power source 14 and connected directly to the base of an NPN grounded emitter transistor 28. The collector of transistor 28 is connected to the positive pole of the dc power source 14 via a series circuit consisting of an LED 29 and a resistor 30. In this case, both the LED's 25 and 29 are arranged within the field of view of a camera finder.

The operation of the circuitry constructed as shown in FIG. 2 will now be described.

Before photographing, both the switches 16 and 18 are kept closed, and the movable contact 19a of the switch 19 is connected to the fixed contact 19b. First, under this condition, a film is loaded in the associated camera, and then the potentiometer 20 is so adjusted that a first reference voltage having a level representative of the upper sensitivity limit of the loaded film is produced on its upper slidable arm 20b, and a second reference voltage having a level representative of the lower sensitivity limit thereof is produced on its lower slidable arm 20c. Thus, under this condition, the negative input terminal of the comparator 21 and the positive input terminal of the comparator 22 are connected via the switch 19 to ground. For this reason, a voltage signal having a substantially zero or ground potential is produced on the common output terminal of the comparators 21 and 22, whereby the transistor 23 is rendered nonconductive and the transistor 28 is made conductive. As a result, the LED 29 is energized to be illuminated and the LED 25 is kept unilluminated.

When, under this condition, a camera shutter (not shown) is released for photographing an object (not shown), then a photocurrent proportional to the brightness of the object flows into the photodiode 11, and the amplifier 12 and the transistors 13 and 15 are rendered conductive. At the same time, the camera front curtain is started and the switch 18 is opened. For this reason, a charging current proportional to photocurrent flowing from the photodiode 11 through the amplifier 12 and the transistors 13 and 15 in the above-mentioned manner flows from the dc power source 14 into the integration capacitor 17. After a predetermined lapse of time in which the capacitor 17 is charged, the camera rear curtain is started and at the same time the switch 16 is opened, thereby terminating the charging operation of the capacitor 17. Consequently, the charged voltage level on the capacitor 17 is determined by the sensed scene brightness and the time interval from the start of the front curtain to the start of the rear curtain, and therefore is proportional to the amount of light exposed on the film. In this case, the reflectibility of that surface portion of the front curtain which faces the lens system 34 has substantially the same value as that of the exposing surface of the film.

Thus, when the rear curtain is moved, then the movable contact 19a of the switch 19 is changed over from the fixed contact 19b to the fixed contact 19c, and a voltage $V_1$ having a level corresponding to the voltage charged on the capacitor is applied to the negative input terminal of the comparator 21 which is commonly connected to the positive input terminal of the comparator 22.

For this reason, when the level of the aforesaid voltage $V_1$ is within the voltage range $V_r$ defined by the upper limit voltage on the upper slidable arm 20b of the potentiometer 20 and the lower limit voltage on the lower slidable arm 20c thereof, then the output voltage produced on the common output terminal of the comparators 21 and 22 has a relatively high level so that the transistor 23 is made conductive, the LED 25 is energized for illumination and the transistor 28 is rendered non-conductive to keep the LED 29 in an off or deenergized state, thereby permitting the photographer to identify that a correct exposure on the film is obtained. Conversely, when the level of the aforesaid voltage $V_1$ is lower or higher than the aforesaid voltage range $V_r$, then the output voltage produced on the common output terminal of the comparators 21 and 22 has a relatively low level so that the transistor 28 is made conductive to illuminate the LED 29, the transistor 23 being made non-conductive, and the LED 25 is kept in an off state, thereby enabling the photographer to identify that a correct exposure on the film is not obtained and preventing subsequent unsatisfactory photographing.

As a result, the camera device in which the circuitry as shown in FIG. 2 is mounted permits the photographer to identify whether or not a correct exposure on the film is accomplished through the camera finder. In this case, it is desirable that the LED's 25 and 29 are illuminated by the different colors in order to enhance the distinguishability therebetween.

It should be noted that the present invention is not limited by the embodiment described herein but may be practiced by any variations and modifications common in the technical concept to the present invention. For example, the LED's 25 and 29 may be replaced by sound producing elements such as buzzers.

What is claimed is:

1. An abnormal operation warning apparatus for a camera, comprising:
   first voltage signal generating means for producing a first voltage signal having a level proportional to the sensitivity of the film used;
   a second voltage signal generating means for producing a second voltage signal having a level proportional to the amount of light exposed onto an exposure surface portion of said film, said second voltage signal generating means comprising a light measuring circuit including a light receiving element for receiving light reflected from the exposure surface portion of the film;
   a comparison means coupled with said first and second voltage signal generating means for comparing the level of said first voltage signal derived from the former with that of said second voltage signal derived from the latter; and
   a discriminating means coupled with said comparison means for detecting the difference between the levels of said first and second voltage signals compared thereby and for generating an output which permits the photographer to identify each photographic result in response to the magnitude of said difference.

2. Apparatus as defined in claim 1, wherein
   said first voltage signal generating means comprises a dc power source a potentiometer including an elongated resistor body connected across said dc power source, and two slidable arms respectively slidable along said resistor body, one of the two slidable arms adapted to be positioned to produce a voltage having a level representative of the upper film sensitivity level and the other of the two slidable arms adapted to be positioned to produce a voltage having a level representative of the lower film sensitivity level;

said comparison means comprises two comparators, one of which has one input terminal connected to one of the two slidable arms of said potentiometer, and the other of which has one input terminal connected to the other slidable arm of said potentiometer, the other input terminals of said comparators being coupled in common to the output of said second voltage signal generating means; and said discriminating means comprises two transistors connected in cascade, the base of the first of which being coupled to the common output terminal of said comparators, the collector-emitter paths of said two transistors being connected across said dc power source, and one of said two transistors being made conductive when a voltage level applied to the common output terminal of said comparators is within a voltage range defined by the two slidable arms of said potentiometer and the other of which being made conductive when said voltage level is lower or higher than said voltage range, and two light emitting elements each energized when a corresponding one of said two transistors is made conductive.

3. Apparatus as defined in claim 2, wherein said two light emitting elements are arranged within the field of view of the associated camera finder.

* * * * *